March 6, 1962 F. J. SINGLETON ETAL 3,024,154
METHOD AND APPARATUS FOR EMBOSSING AND PRINTING
THERMOPLASTIC FILM AND THE PRODUCT THEREOF
Filed April 4, 1958 3 Sheets-Sheet 1

INVENTORS
F. JAY SINGLETON
ARTHUR D. SYLVESTER
BY
Lester N. Clark
ATTORNEY

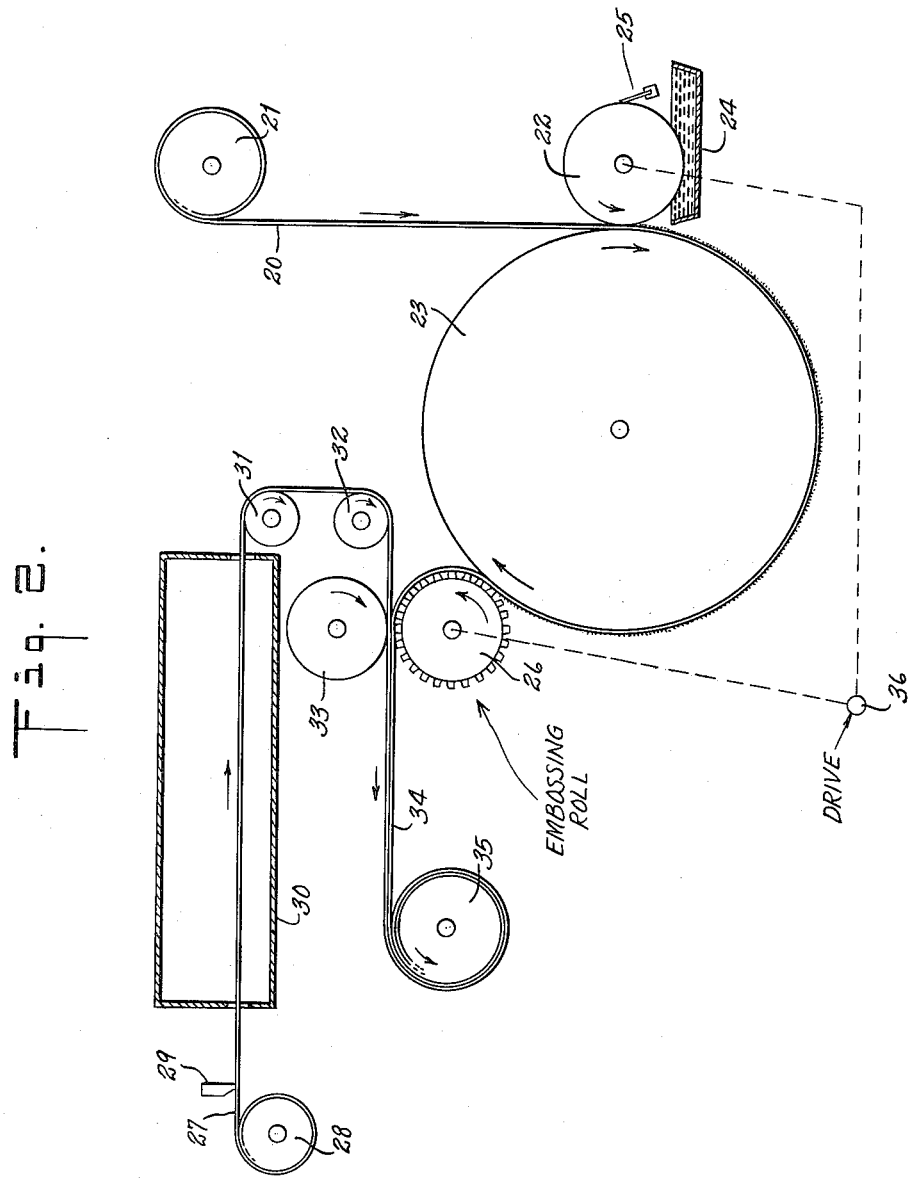

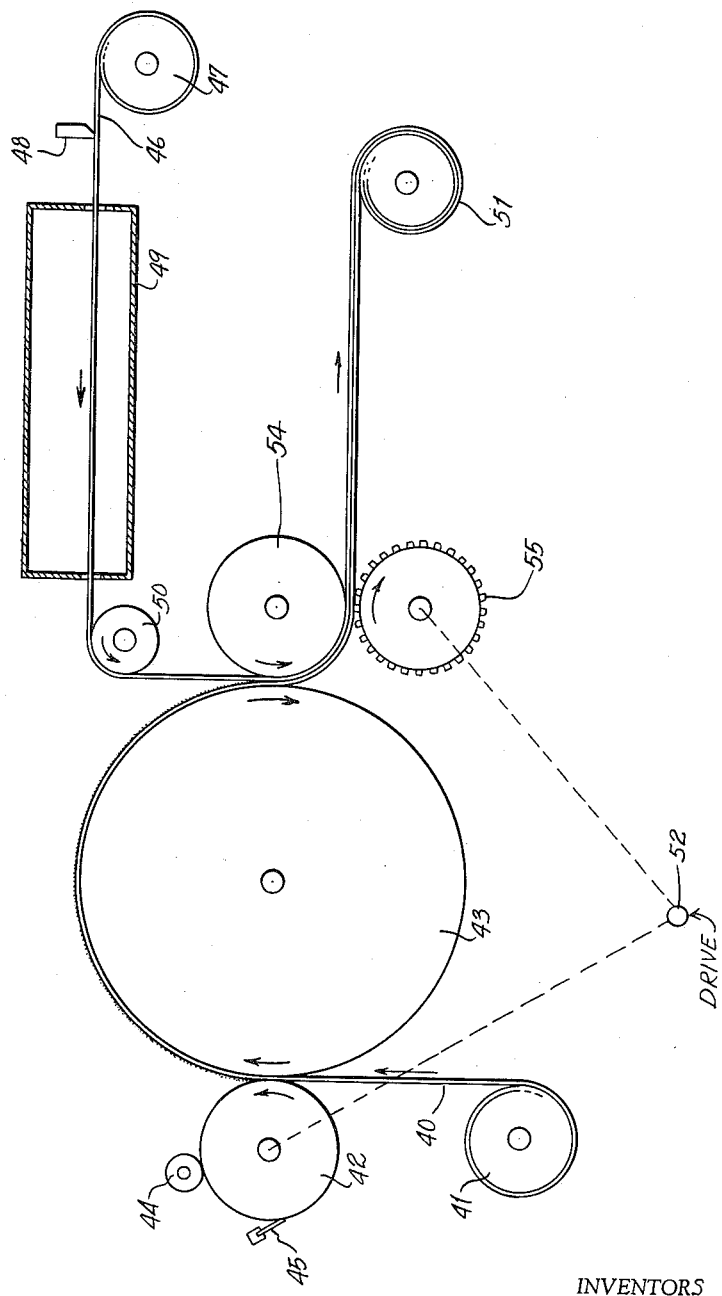

United States Patent Office 3,024,154
Patented Mar. 6, 1962

3,024,154
METHOD AND APPARATUS FOR EMBOSSING AND PRINTING THERMOPLASTIC FILM AND THE PRODUCT THEREOF
Franklin J. Singleton, Sparta, N.J., and Arthur D. Sylvester, Rowayton, Conn., assignors to L. E. Carpenter & Company, Wharton, N.J., a corporation of New Jersey
Filed Apr. 4, 1958, Ser. No. 726,444
22 Claims. (Cl. 156—209)

This invention relates to the art of embossing thermoplastic film. One aspect of the invention concerns the embossing of thin (up to .003") films. Another feature relates to embossing such films and printing thereon in registry with the embossing.

Thermoplastic film is currently in common use for a wide variety of different purposes, including covering materials of one kind or another, e.g., wrapping materials, table cloths, and the like.

It has been proposed to emboss such films with an indented design in order to improve their appearance. Such materials must be heated to be embossed. These materials are commonly manufactured in the form of elongated webs, and are conventionally heated by passing the web through an elongated heater or furnace, in which the web temperature is gradually raised to the softening point.

These materials are not dimensionally stable when heated. In other words, when heated sufficiently so that they may be embossed, they tend to expand or contract differently in different parts of a sheet. These dimensional changes have heretofore been uncontrollable. Furthermore, the materials of the prior art tend to stretch during and after the embossing in such a way that the indented contours produced by the embossing deteriorate during subsequent handling, and either disappear completely or lose their definition to a large extent, thereby adversely affecting the appearance of the material.

Because of the lack of dimensional stability of such materials during the heating process which is incident to embossing, it has heretofore been practically impossible to print and emboss in registry on such a material. The printing must be done on cool (i.e., room temperature) material. When the printing was done first, the material would stretch unpredictably during the preheating required for embossing so that later when the materials came in contact with the embossing plate or rolls, the printed areas would not register or line up properly with the embossed areas. When the embossing was done first, a similar difficulty was encountered, since the dimensions between various areas of the sheet would change during cooling between the embossing roll or plate and the printing roll or plate.

It is an object of this invention to provide an improved and simplified process and apparatus for deeply and stably embossing a thin thermoplastic film.

Another object is to provide improved and simplified apparatus and method for printing and embossing in registry on thermoplastic film.

A further object of the invention is to provide improved products of the processes and apparatus described.

The foregoing objects are attained in accordance with the present invention by heating a sheet-like mass of thermoplastic material having a thickness substantially greater than the thickness of the film to be embossed, to a temperature above the softening temperatures of the thin film and of the sheet-like mass. The thin film to be embossed is then brought into contact with one surface of the heated thermoplastic mass. This is the only manner in which heat is supplied to the film. Immediately upon or soon after the contact is made between the thin film and the heated thermoplastic mass, the film and the mass together are fed between a cooled embossing roll having the usual embossing indentations in its surface, and a back-up roll opposed to and cooperating with the embossing roll. Thus, the film is heated for only a very short time and for a very short distance along its path of travel. Consequently, as compared to prior art processes, only a very short length of the film web is subjected to heat at any given time. A substantial pressure is applied between the rolls to squeeze the sheet materials together, thereby forcing the thermoplastic mass and the film into the indentations of the embossing roll.

After leaving the embossing rolls, the thermoplastic mass and film are cooled and may then be separated, and the thermoplastic mass may be reused after removal of the embossed indentations therefrom. Alternatively, the mass and the film may be kept together to provide a laminated product.

Where the film is to be printed in registry with the embossing, the printing is done before embossing, with a printing cylinder having a diameter equal to the embossing roll diameter. The printing may be on either side of the film. Where the product is to be laminated as suggested above, the printing may be on the outside of the thin film, or if the film is transparent, the printing may be on the inside of the film, i.e., on the surface thereof next to the thicker thermoplastic sheet.

Other objects and advantages of the invention will become apparent from a consideration of the appended specification and claims, taken together with the accompanying drawings.

In the drawings:

FIG. 1 is a somewhat diagrammatic illustration of an apparatus constructed in accordance with the invention for embossing thin thermoplastic film;

FIGS. 1A, 1B and 1C are cross-sectional views taken respectively on the lines A—A, B—B, and C—C of FIG. 1, showing the structure of materials treated in that apparatus at various points therein;

FIG. 2 is a somewhat diagrammatic illustration of apparatus constructed in accordance with the invention for printing and embossing a thin thermoplastic film; and FIG. 3 is a somewhat diagrammatic illustration of a modified form of apparatus for printing and embossing on a thin thermoplastic film.

FIG. 1

This figure illustrates apparatus for embossing a thin thermoplastic film. The film is indicated in the drawing by the reference numeral 1. The film is shown as being an elongated web or strip which proceeds from a supply reel 2 over an expander roll 3 and thence passes over the periphery of a cooled embossing roll 4, which cooperates with a backing roll 5. As the film 1 passes between the rolls 4 and 5, it is brought into contact with the upper surface of a sheet or mass of thermoplastic material, several times as thick as the film 1, and generally indicated in the drawing by the reference numeral 6. The film and the thicker mass of thermoplastic material are embossed between the rolls 4 and 5, the projections on the embossing roll being effective to force indentations in the film 1 and in the mass 6. The film and the supporting mass then proceed together downwardly and pass between a pair of idler rolls 7 and 8. The film 1 passes over the idler roll 8 and is separated or stripped from the supporting mass 6, which passes over the idler roll 7. The film 1 then proceeds to a take-up reel 9, while the thermoplastic mass 6 proceeds to another take-up reel 10.

The thermoplastic mass 6 may consist of a backing sheet of heavy material such as cotton duck or the like, as illustrated diagrammatically at 11 in FIG. 1A. On the upper surface of the backing material there is superimposed a layer of thermoplastic material, for example a vinyl dispersion, which may be either of the plastisol or organisol types. This layer is indicated in FIG. 1A by the reference numeral 12.

The sheet material 6, with its plastic layer in a cool and solid, but flexible condition, passes from a supply reel 13 over a pair of idler rolls 14 and 15. As this sheet passes the idler roll 15, it is exposed to an atomizer 16 which coats its surface with a suitable mold release agent, which may, for example, be an oil and water emulsion of silicone oil having a density of about 8.2 lbs. per gallon. The release agent may be omitted if the surface of the sheet 6 is of a material which does not adhere to the thin film 1. The sheet 6 then passes through a heater 17, which may be of the infra-red type and which heats the thermoplastic material on the sheet 6 to its softening temperature, or preferably well above the softening temperature. In the case of a vinyl dispersion, the temperature at the exit end of the heater 17 will be somewhat above the fusion temperature of the dispersion layer 12. The dispersion layer 12 and the film 1 should be selected so that this heater exit temperature is also above the softening temperature of the film 1.

As the sheet 6 leaves the heater 17, it passes between the rolls 4 and 5 and at that point is brought into contact with the thin film 1, which is proceeding around the embossing roll 4. At this point, sufficient heat is transferred from the sheet 6 to the film 1 to soften the film and render it sufficiently pliable so that it may be embossed as it passes between the rolls 4 and 5. Since the film 1 is relatively thin as compared to the layer of plastic material on the sheet 6, the necessary heat is transferred to the film 1 very quickly. The transfer of heat takes place at a time when the film 1 is held snugly against the surface of the roll 4, so that the film 1 is held against uncontrolled dimensional change due to the heating. Furthermore, only a very small portion of the length of the film 1 is heated at any particular time, and the possibility of such dimensional change of the film is thereby further reduced. These conditions are favorable for the embossing of the film and the sheet at this point of their engagement.

As an example of suitable materials for use in the process and apparatus described above, the sheet 6 may consist of cotton duck sheeting covered with a layer of a polyvinyl chloride dispersion about .020" thick. The film 1 may be any light gauge thermoplastic film, not over .004" thick. For example, Mylar (polyethylene terephthalate) polyvinyl films, and polyethylene films have been successfully used. The heater 17 must be long enough to bring the sheet 6 to a temperature of 400° C. A force of about 125 to about 300 lbs. per linear inch of roll length is applied between the rolls 4 and 5.

As the two webs pass between the rolls 4 and 5, the sheet 6, being at the proper condition to be embossed, and having sufficient bulk to fill the recesses in the embossing roll 4, forces the lighter film 1 into the mold ahead of it, at the same time transferring enough heat to the film 1 to ensure positive embossing. After embossing the film 1 and the sheet 6 travel together until they are cool. They are then separated and taken to their respective take-up reels 9 and 10.

The appearance of the film 1 after embossing and stripping from the sheet 6 is illustrated in FIG. 1B. The appearance of the sheet 6 after embossing and stripping from the film 1 is illustrated in FIG. 1C. FIG. 1A shows the composite laminated sheet consisting of the film 1 and the underlying sheet 2, both embossed by indentations which are several, e.g. as many as seven or eight times as thick as the film 1.

As an alternative, if it is desired to form a laminated product, the mold release agent may be omitted, in which case a permanent bond is formed between the film 1 and the web 6 during the embossing step, providing that the materials are selected for the film and web to secure adhesion between them. The laminated web may then be taken up on a single reel.

The sheet material 6 taken up separately on the reel 10 may be reheated to remove the embossed pattern, and it may then be reused to support another film web in a similar embossing process. As an alternative to reheating, the thermoplastic material 12 used in the sheet 6 may be one having a short term memory, so that the pattern embossed in it is erased or fades after a short time.

Instead of using a separated elongated strip as a carrier for the film 1, the sheet or mass 6 may be in the form of a continuous smooth rubber-like belt. In the latter event, the embossed pattern must be removed from the rubber-like material on the belt before it reengages the film 1 on the next cycle. A belt of about 30 mils thickness of silicone rubber having a durometer hardness of about 60, on a woven glass backing, has been found to give satisfactory results. The belt returns quickly to its original smooth contour after the embossing operation.

As illustrated in FIG. 1B, the product of the process and apparatus described above follows faithfully the contour of the embossing roll, even as to sharply defined curves and corners whose radius of curvature is of the same order of magnitude as the film thickness. Moreover, the contour of the embossed material is permanent (unless the material is reheated) and the embossed contours are not removable by stretching the film.

FIG. 2

This figure illustrates diagrammatically a modified form of apparatus constructed in accordance with the invention, for producing a laminated product including an underlying supporting layer of thermoplastic material and a covering layer of thermoplastic film, having printed and embossed designs in registry on the film. Alternatively, this apparatus may be modified to produce a thin film having printed and embossed designs in registry thereon.

A film 20 passes from a supply reel 21 between a printing cylinder 22 and a printing back-up roll 23. The cylinder 22 is supplied with ink by a suitable inking mechanism illustrated as a trough 24, the surplus ink being removed from the cylinder by a doctor blade 25. The printed film leaving cylinder 22 passes around the periphery of the back-up roll 23 and is transferred to the periphery of an embossing roll 26, which must have the same diameter as the printing roll 22.

A backing sheet 27 of cotton duck, or other suitable material passes from a supply reel 28 past a coating device 29, which deposits thereon a thermoplastic coating or mass of substantial thickness, preferably several times the thickness of the film 20. The sheet 27 with its coating then passes through a heater 30 where the thermoplastic mass is heated to a temperature well above its softening temperature, and also higher than the softening temperature of the film 20. The sheet 27 then passes over two idler rolls 31, 32, which may be either heated or unheated, and then passes between the embossing roll 26 and a backing roll 33. Between the rolls 26 and 33, the film 20 is forced into engagement with the surface of the plastic material on the sheet 27 and the two are embossed together, as in the process described in connection with FIG. 1. The composite sheet material, indicated generally by the reference numeral 34, then proceeds, after a suitable cooling interval to a take-up reel 35. The covering on the backing rolls 23 and 33 may be neoprene rubber ⅜" to 1" thick with a durometer hardness from 40 to 75 (A scale).

The embossing roll 26 and the printing roll 22 must have the same diameters, and they must be driven synchronously, as indicated diagrammatically at 36 in FIG. 2. Furthermore, the length of material between the bite of the printing cylinders and the bite of the embossing rolls must be a full multiple of the circumference of the printing cylinder. If they are so constructed and driven, then the pattern printed on the film 20 by the printing cylinder 22, will register with the pattern embossed by the roll 26. The printed areas of the film 20 may be the same ones that are embossed by the roll 26, or the printed areas may intervene between the embossed areas. Note that the film 20 is supported snugly against the roll 23 or the embossing roll 26 throughout its travel between its contact by the printing cylinder 22 and its embossing between the rolls 26 and 33. The film 20 thereby has little or no stretching force applied to it during this portion of its travel. If required, suitable drying mechanism may be placed adjacent the path of the film after it leaves the printing cylinder and before it engages the embossing roll 26 to dry the ink on the surface of the film. A quick-drying ink is to be preferred, but since the inked portions of the film always engage the same parts of the embossing roll, there is little danger of the printed pattern being distorted or spread by the embossing rolls unless the inking is exceptionally heavy.

Instead of using a single printing cylinder with one color of ink, a plurality of printing cylinders, each with a different color of ink may be used to print a multi-color pattern, in accordance with techniques well known in the art.

Note that the printing on the film 20 appears on the outer surface of the composite laminated sheet material 34.

Instead of keeping the film and the underlying layer together after they leave the embossing rolls, they may, if they are selected so as not to adhere, be stripped from each other and wound on separate take-up reels, as in FIG. 1. In that event, the supporting layer may be a continuous smooth rubber-like belt, as suggested in connection with FIG. 1. Polyethylene and Mylar (polymerized ethylene glycol terephthalate) are examples of films which do not adhere securely to vinyl unless precoated with a suitable adhesive.

FIG. 3

In some cases, where the laminated sheet material is to be subject to abrasion or other factors which might tend to fade or destroy the printing, the inner surface of the film, which is next to the underlying layer of thermoplastic material, may be printed.. An apparatus for carrying out such a process is illustrated in FIG. 3. The film in such a process must necessarily be transparent, or at least translucent, in order that the printing may be observed.

In FIG. 3, a thin film 40 proceeds from a supply reel 41 past a printing cylinder 42 which cooperates with a backing roll 43. The printing cylinder 42 is provided with suitable ink supply mechanism including an inking roller 44 and a doctor blade 45 for removing excess ink. The film 40 passes around the back-up roll 43 and between it and a back-up roll 54 which cooperates with an embossing roll 55. Between the rolls 43 and 54, the printed film 40 encounters a sheet 46 of supporting material covered with a layer of thermoplastic material. The sheet material 46 may be of cotton duck or any other suitable textile. This material passes from a supply reel 47 past a coating device 48 which applies to the sheet 46 a layer of thermoplastic material of substantial thickness, preferably several times as thick as the film 40. After receiving the coating, the sheet 46 passes into a heater 49 where it is brought to a temperature sufficient to soften the thermoplastic material. Upon leaving the heater 49, the sheet 46 passes around an idler roll 50 and thence between the back-up rolls 43 and 54 where it is pressed firmly into engagement with the printed film 40. Note that the printed side of the film 40 is against the sheet 46 of thermoplastic material. The composite web comprising the sheet 46 and the film 40 passes around the back-up roll 54 and between it and the embossing roll 55, where it is embossed, and then, after a distance of travel sufficient for adequate cooling, the composite sheet is taken up on a take-up reel 51.

As in the case of FIG. 2, the diameter of the printing cylinder 42 must be the same as the diameter of the embossing roll 55, and the two must be driven synchronously, as indicated diagrammatically at 52 in FIG. 3, in order that the printed pattern may register properly with the embossed pattern. It is also highly desirable that the back-up roll 54 have the same diameter as the printing cylinder 42 and be driven synchronously therewith.

In the product of the process and apparatus illustrated in FIG. 3, the printing is on the inside of the film 40 in the finished material and may be observed only through the film 40.

Various modifications of the process and apparatus of FIG. 3 may be made, as noted above in connection with FIGS. 1 and 2.

While we have shown and described certain preferred embodiments of our invention, other modifications thereof will readily occur to those skilled in the art, and we therefore intend our invention to be limited only by the appended claims.

We claim:

1. A method for embossing a thin thermoplastic film, comprising heating a sheet-like mass of thermoplastic material substantially thicker than the film to a temperature substantially above the softening temperatures of the material and of the film, bringing one surface of the film in a relatively cool condition into contact with a surface of the heated sheet-like mass, and thereby transferring to said film sufficient heat to soften said film, moving the film and the sheet-like mass together between a cooled, indented embossing element and a backing element while pressing said elements together, with sufficient pressure to force the film and the mass into the indentations of the embossing element, and thereafter cooling said mass and said film.

2. A method for embossing thermoplastic film as defined in claim 1, in which the indentations on the embossing element are up to eight times the thickness of the film.

3. A method for embossing thermoplastic film as defined in claim 1, in which said sheet-like mass is a dispersion of polyvinyl chloride.

4. A method for embossing thermoplastic film as defined in claim 1, in which said sheet-like mass is of silicone rubber.

5. A method for embossing thermoplastic film as defined in claim 1, in which said sheet-like mass is of thermoplastic material having a relatively short memory time and including the further step of stripping the sheet-like mass from the film within said memory time.

6. A method for embossing thermoplastic film as defined in claim 1, in which the film is brought into contact with the sheet-like mass simultaneously with the movement thereof between the embossing element and the backing element.

7. A method for embossing thermoplastic film, as defined in claim 1, in which said film and said sheet-like mass are elongated webs, and including the further step of holding the film web snugly against the surface of a roll just prior to and during its initial contact with the sheet-like material, and holding the two webs together against a roll surface from the locality where they first contact each other to the locality where they pass between the embossing element and the backing element.

8. A method for embossing thermoplastic film as defined in claim 1, including the further step of separating the film from the sheet-like mass after the embossing.

9. A method for embossing thermoplastic film as defined in claim 1, in which said film and said sheet-like mass are maintained together after embossing to produce a laminated product.

10. A method for printing and embossing in registry on thermoplastic film, comprising printing on a surface of said film, heating a sheet-like mass of thermoplastic material thicker than the film to a temperature substantially above the softening temperature of the material and of the film, bringing one surface of the printed film in a relatively cool condition into contact with a surface of the heated sheet-like mass and thereby transferring to said film sufficient heat to soften it, moving the film and the sheet-like mass together between a cooled, indented embossing element and a backing element while pressing said elements together with sufficient pressure to force the film and the mass into the indentations of the embossing element, and thereafter cooling said mass and said film.

11. A method for printing and embossing in registry on thermoplastic film as defined in claim 10, including supporting said film firmly against a travelling element throughout its path between the locality of contact with said sheet-like mass and the locality of embossing.

12. A method for printing and embossing in registry on thermoplastic film as defined in claim 10, in which the film is moved into contact with the sheet-like mass and embossed simultaneously.

13. A method for printing and embossing in registry on thermoplastic film as defined in claim 10, in which the printing is performed by an inked cylinder and the embossing element is a cylinder having a diameter equal to that of the printing cylinder.

14. A method for printing and embossing in registry on thermoplastic film as defined in claim 10, in which the film and the mass are maintained together after embossing as a laminated product.

15. A method for printing and embossing in registry on thermoplastic film as defined in claim 10, in which the printed surface of the film is on the outside of said laminated product.

16. A method for printing and embossing in registry on thermoplastic film as defined in claim 10 in which the film is transparent and the printed surface of the film is adjacent the sheet-like mass and is thereby inside the laminated product.

17. Apparatus for embossing thermoplastic film, comprising a sheet-like mass of thermoplastic material substantially thicker than the film, means for heating said sheet-like mass, an embossing roll and a cooperating backing roll, means for moving said sheet-like mass out of the heating means and to and between said rolls, and means for moving said film into contact with said mass as said mass moves from said heating means to said rolls, said rolls being effective to emboss said film and said mass together.

18. Apparatus as defined in claim 17, wherein said film moving means comprises means for guiding the film to engage the periphery of a given one of said rolls at a locality in advance of the locality of nearest approach of said film to the other roll, said guiding means cooperating with said given roll to hold said film in snug engagement with said given roll as the film moves into contact with the mass.

19. Apparatus for printing and embossing in registry on thermoplastic film, comprising a printing cylinder, a first backing roll, means for feeding said film between said cylinder and said backing roll for printing a pattern thereon, a sheet-like mass of thermoplastic material substantially thicker than the film, means for heating said sheet-like mass, an embossing roll and a cooperating backing roll, means for moving said sheet-like mass out of the heating means and to and between said cooperating embossing and backing rolls, means for moving the printed film into contact with said mass as the mass moves from the heating means to the cooperating embossing and backing rolls, said cooperating embossing and backing rolls being effective to emboss a pattern on said film and said mass together, said printing cylinder and said embossing roll having equal diameters and being separated along said film by a distance which is a multiple of the circumference of said printing cylinder, and means driving said printing cylinder and said embossing rolls synchronously so that the printed and embossed patterns appear in registry on the film.

20. Apparatus as defined in claim 19, in which said first backing roll runs in tangential relation to a given one of said cooperating embossing and backing rolls, and said film moving means comprises means for guiding the film to remain on the periphery of the first backing roll from the locality of the printing contact to the locality of the tangency between said first backing roll and said given roll, and thereafter to follow the periphery of said given roll until it reaches the locality of embossing, so that the film path between the locality of printing and the locality of embossing is always defined by a roll periphery.

21. Method of producing an embossed thermoplastic film comprising heating a mass of thermoplastic material in the form of a sheet of substantially greater thickness than the film to a temperature not substantially less than the softening temperature of the film, said thermoplastic material of said sheet at the temperature to which it is heated maintaining said sheet form while being mechanically deformable by embossing, bringing said film at a temperature substantially less than its softening temperature into laminated relation to said sheet with a surface of said film in contact with a surface of said heated sheet so as to transfer to said film sufficient heat to soften said film, pressing said film and the sheet together simultaneously to produce embossing of said film and sheet with the film in embossed form conforming in surface engagement with the embossed surface of said sheet, and thereafter cooling said laminated film and sheet to harden the thermoplastic materials thereof.

22. Method of producing an embossed thermoplastic film as defined in claim 21 which comprises the step of separating said embossed thermoplastic film from said sheet.

References Cited in the file of this patent

UNITED STATES PATENTS

| | | |
|---|---|---|
| 2,218,227 | Winnek | Oct. 15, 1940 |
| 2,392,594 | Karfiol et al. | Jan. 8, 1946 |
| 2,477,300 | Karfiol et al. | July 26, 1949 |
| 2,675,852 | Pasquale | Apr. 20, 1954 |
| 2,693,221 | Lyijynen | Nov. 2, 1954 |
| 2,783,175 | Smith et al. | Feb. 26, 1957 |
| 2,793,677 | Armstrong | May 28, 1957 |
| 2,816,853 | Meyers | Dec. 17, 1957 |
| 2,877,151 | Doherty et al. | Mar. 10, 1959 |